US007644967B2

(12) United States Patent
Airey

(10) Patent No.: US 7,644,967 B2
(45) Date of Patent: Jan. 12, 2010

(54) HANDLING TOOL FOR RADIOACTIVE SOURCES OF LOGGING WHILE DRILLING DEVICES

(75) Inventor: Peter Airey, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/007,401

(22) Filed: Dec. 8, 2004

(65) Prior Publication Data

US 2005/0140153 A1 Jun. 30, 2005

(30) Foreign Application Priority Data

Dec. 31, 2003 (EP) ................................. 03293354

(51) Int. Cl.
*B25J 15/00* (2006.01)
*G01V 5/04* (2006.01)

(52) U.S. Cl. ......................... 294/86.4; 294/93; 294/906

(58) Field of Classification Search ................ 294/19.1, 294/86.4, 86.12, 86.24, 86.25, 93–95, 906; 250/254–256, 496.1, 506.1
See application file for complete search history.

(56) References Cited

U.S. PATENT DOCUMENTS

| | | | | |
|---|---|---|---|---|
| 2,285,440 | A * | 6/1942 | Kaiser | 250/493.1 |
| 2,675,487 | A | 4/1954 | Tompkins | |
| 2,948,383 | A * | 8/1960 | Modrey | 198/680 |
| 3,971,482 | A * | 7/1976 | Andrea | 376/268 |
| 4,236,966 | A * | 12/1980 | Savin et al. | 376/271 |
| 4,259,153 | A * | 3/1981 | Pryamilov et al. | 376/262 |
| 5,126,564 | A | 6/1992 | Perry | |
| 5,342,158 | A | 8/1994 | Isaacson | |
| 2003/0151007 | A1 | 8/2003 | White et al. | |

FOREIGN PATENT DOCUMENTS

| | | |
|---|---|---|
| GB | 2276898 | 10/1994 |
| WO | WO 00/52707 | 9/2000 |

* cited by examiner

*Primary Examiner*—Dean J Kramer
(74) *Attorney, Agent, or Firm*—Darla P. Fonseca; Jaime Custano

(57) ABSTRACT

A handling tool (100) for securely handling a radioactive source (204) comprises a first securing device and a second securing device. The first securing device comprises a chamber (103), and an opening mechanism (105, 106) for opening the chamber (103). The opening mechanism opens the chamber when the chamber is brought in proximity with a source pocket that may contain a radioactive source (204), and the opening mechanism closes the chamber when the chamber is withdrawn from the source pocket (200). The second securing device comprises a gripping device (111, 112, 113, 114, 115, 116, 117) to grip and release a radioactive source (204), and a positioning mechanism (109, 110, 116) for positioning the gripping device in the source pocket (200) or inside the chamber (103) of the first securing device.

17 Claims, 2 Drawing Sheets

HANDLING TOOL FOR RADIOACTIVE SOURCES OF LOGGING WHILE DRILLING DEVICES

TECHNICAL FIELD

The invention relates generally to a tool for handling radioactive sources.

BACKGROUND ART

Radioactive sources are frequently used in measurement devices.

One example of use of a radioactive source is a Logging While Drilling (LWD) application in which a sonde is lowered in a well being drilled. The sonde typically contains a radioactive source and one or more suitable detectors. The sonde allows to gather information about the earth formation being drilled and surrounding the well. The sonde progresses in the well while drilling, and it thus becomes possible to measure some parameters of the earth's formations.

The radioactive source may for example be a chemical radioactive source and be transported in a carrying shield device. Prior to the LWD measurement, the radioactive source needs to be transferred from the carrying shield device into a location of an LWD collar. After LWD measurement, the radioactive source is extracted from its location in the LWD collar back into the carrying shield device.

The carrying shield device is typically made from an appropriate material that prevents manipulating personnel from being exposed to the radioactivity. In case the personnel does get exposed to radioactivity, the radioactive dose absorbed by personnel during exposure is a function of the time spent and the inverse of the square of the distance separating the personnel from the source. In other words, if the distance between the personnel and the source is reduced by half, the absorbed dose may be increased fourfold. For this reason the distance between the source and the personnel must at all times be maintained at the highest possible value.

The manipulating of the source is a critical process where contradictory requirements of keeping the personnel at a safe distance and preventing the loss of the source must be met at the same time.

GB 2276898 A (TELECO OILFIELD SERVICES NC) Dec. 10, 1994 discloses an example of container housing for introducing and mounting a radioactive source within a passage in a borehole logging tool. The contained has at one end a threaded extension for mounting in the logging tool. The container has at its other end a bayonet for engagement with the bayonet connection of a handling tool for inserting the container into the passage.

In order to prevent the loss of the source, it is known to implement dual attachment systems for the source in the carrying shield device and in the logging tool. It is further known to use source handling systems comprising redundant source attachment systems. In such redundant systems, if one system fails to retain the source, the other may still be effectively attaching the source.

One example of a source handling system comprising a redundant attachment system uses a set of fingers and a wire spring clip. The set of fingers is used as a first means for holding the source. The set of fingers is mounted at one source proximate extremity of an elongated handling tool. The fingers typically close around a conical head of the source. The fingers are closed by screwing a handle at an extremity of the handling tool opposite from the source side extremity. Next, the wire spring clip is used as a second means for attaching the source to the handling tool. The wire spring clip is attached to a piece of chain. One extremity of the chain is permanently attached to the source proximate extremity of the handling tool. In order to attach the source with the wire spring clip, the source comprises an appropriate hole, and the clip is pushed into the hole of the source. The attachment of the wire spring clip to the source requires that the personnel brings its hands within a few centimeters of the source.

In the described example of redundant attachment system, it appears that the wire spring clip is frequently not used. One reason for not using the clip is personnel's concern to be exposed to radioactivity. Another reason for not using the clip is its relative unreliability to hold the source should it escape from a grip of the fingers.

DISCLOSURE OF THE INVENTION

In a first aspect, the invention provides a handling tool for securely handling a radioactive source, the handling tool comprising a first securing device and a second securing device. The first securing device comprises a chamber, and an opening mechanism for opening the chamber. The opening mechanism opens the chamber when the chamber is brought in proximity with a source pocket that may contain a radioactive source, and the opening mechanism closes the chamber when the chamber is withdrawn from the source pocket. The second securing device comprises a gripping device to grip and release a radioactive source, and a positioning mechanism for positioning the gripping device in the source pocket 200 or inside the chamber 103 of the first securing device.

In a first preferred embodiment the first securing device further comprises an elongated tube mounted to the chamber. The elongated tube allows to position the chamber.

In a second preferred embodiment the opening mechanism comprises an annular flapper cage, the annular flapper cage being slidably mounted on the chamber. The annular flapper cage slides to an open position relative to the chamber when the chamber is brought in proximity with the source pocket. The annular flapper cage slide to a closed position relative to the chamber when the chamber is withdrawn from the source pocket. The opening mechanism further comprises a flapper movably mounted onto the annular flapper cage such that the flapper moves to open the chamber in the open position of the annular flapper cage, and the flapper moves to close the chamber in the closed position of the annular flapper cage.

In a third preferred embodiment the opening mechanism comprises a spring that maintains the annular flapper cage in the closed position when the chamber is withdrawn from the source pocket. The spring is deformed when the annular flapper cage is brought into the open position.

In a fourth preferred embodiment the flapper produces an optical indication indicating if the chamber is open.

In a fifth preferred embodiment, the gripping device comprises a core having at least a section of a first diameter and a section of a second diameter. The first diameter is greater than the second diameter. The gripping device further comprises at least one spring finger, the spring finger producing an engaging structure of variable size, the spring finger being movably connected to the core, such that the spring finger may be positioned at either one of the first diameter or the second diameter of the core. The spring finger produces an engaging structure of large size when the spring finger is positioned at the first diameter, and the spring finger is able to produce an engaging structure of small size when the spring finger is positioned at the second diameter, the small size being inferior than the large size.

In a sixth preferred embodiment, the gripping device further comprises a rod. The rod allows to position the core relative to the spring finger when the rod is actuated.

In a seventh preferred embodiment the positioning mechanism comprises a second elongated tube. The second elongated tube is mounted to the gripping device. The second elongated tube further passes through a wall of the chamber, and the second elongated tube allows to position the gripping device when the second elongated tube is actuated.

In an eighth preferred embodiment the gripping device comprises a second elongated tube. The rod passes inside the second elongated tube, the second elongated tube further passing through a wall of the chamber, and the second elongated tube allowing to position the gripping device in the source pocket or inside the chamber when the second elongated tube is actuated.

In a ninth preferred embodiment, the second securing mechanism comprises a second elongated tube. The second elongated tube cooperates with the positioning means and the gripping device, and slides through the elongated tube of the first securing device in order to access the inside of the chamber, and in order to position the gripping device.

In a tenth preferred embodiment, the second elongated tube comprises at an extremity opposite from the gripping device, control means for actuating the gripping device.

In an eleventh preferred embodiment, the handling tool further comprises a retainer mechanism actuator to cooperate with a retainer mechanism of the source pocket, the retainer mechanism allowing to release the radioactive source from the source pocket when actuated by the retainer mechanism actuator.

In a twelfth preferred embodiment, the retainer mechanism actuator comprises a ring, the ring being included with the second securing device.

In a second aspect, the invention provides a source pocket for receiving a radioactive source. The source pocket comprises retaining means that allow to retain the radioactive source inside the source pocket when in a retaining position and to release the radioactive source when in a release position. The source pocket further comprises sealing means that allow to seal the radioactive source inside of the source pocket.

In a thirteenth preferred embodiment the retaining means comprise positionable retaining fingers. The source pocket further comprises a threaded opening made in the source pocket to receive a sealing plug.

In a third aspect, the invention provides a logging tool for use in a well comprising a source pocket.

In a fourth aspect, the invention provides a portable storage receptacle for a radioactive source comprising retaining means that allow to retain the radioactive source inside the receptacle when in a retaining position, and to release the radioactive source when in a release position.

In a fifth aspect, the invention provides a method for securely handling a radioactive source, comprising pushing a closed chamber of a handling tool into a source pocket, thereby opening the chamber, and remotely controlling a movement of a gripping device from inside the chamber to inside the source pocket. The method further comprises gripping a radioactive source located inside the source pocket using the gripping device, remotely controlling the movement of the gripping device from the inside of the source pocket to the inside of the chamber, thereby retrieving the radioactive source from the source pocket, and withdrawing the open chamber away from the source pocket, thereby closing the chamber.

In a fourteenth preferred embodiment, a retaining mechanism is released inside of the source pocket by the movement of the gripping device inside the source pocket.

In a fifteenth preferred embodiment, at least a part of the gripping device is introduced into a recess of a radioactive source, and the introduced part of the gripping device is expanded by remote control to attach the radioactive source to the gripping device.

Other aspects and advantages of the invention will be apparent from the following description and the appended claims.

MODE(S) FOR CARRYING OUT THE INVENTION

The invention will now explained using descriptions of example embodiments and Figures.

Handling Tool

Figure 1:
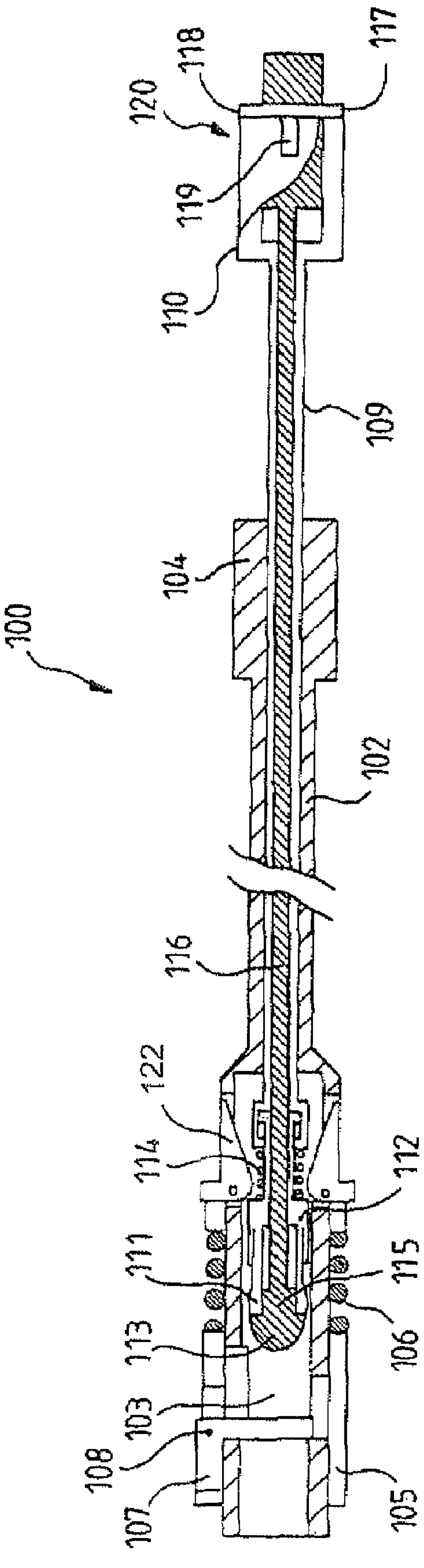
FIG. 1 is a schematic illustration of an example of handling tool according to the invention.

FIG. 1 shows an example embodiment of a handling tool 100 for a radioactive source (not represented in FIG. 1) according to the invention.

The handling tool 100 comprises an elongated tube 102 that is terminated at an extremity proximate the radioactive source by a chamber 103, and by a handle 104 at an extremity towards an operator, i.e., an extremity opposite the radioactive source.

An annular flapper cage 105 is movably mounted on the chamber 103. The annular flapper cage 105 may slide along the chamber 103 in both directions towards or away from the handle 104, the directions being oriented substantially parallel to the elongated tube 102 in this example.

As the annular flapper cage 105 slides towards the handle 104, the flapper cage 105 compresses a spring 106. During a movement towards the handle 104, a flapper 107 of the annular flapper cage 105 rotates around an axis 108, thereby creating an opening in the chamber 103. In the open position, a part of the rotated flapper 107 protrudes from the annular flapper cage 105 and may be used as a visual indicator that the flapper 107 is open.

When the spring 106 pushes the annular flapper cage 105 away from the handle 104, the flapper 107 rotates back to its initial position and closes the chamber 103. In the initial position, a part of the flapper 107 orientated towards a periphery of the handling tool 100 lies flush with a wall of the chamber 103, and thereby gives an optical indication as to the closure of the chamber 103.

An outer diameter of the chamber 103 is dimensioned appropriately to be introduced into a hole of a radioactive measurement tool, such as for example, the LWD tool, or a storage receptacle, such as for example a carrying shield device (both not shown in FIG. 1). The annular flapper cage 107 has a diameter greater than the outer diameter of the chamber 103, preventing it from being inserted in the radioactive measurement tool of the storage receptacle.

When the chamber 103 is pushed inside the hole of the radioactive measurement tool or storage receptacle, the annular flapper cage 107 remains outside the hole and is thereby pushed back, sliding along the chamber 103 towards the handle 104, and opening the flapper 107. The spring 106 is compressed during this process.

When the chamber 103 is extracted from the hole of the radioactive measurement tool or the storage receptacle, the compressed spring 106 pushes on the annular flapper cage 107, causing the flapper cage 107 to slide away from the handle 104, along the chamber 103, and rotating the flapper 107 in the closed position, the chamber 103 being closed before it is fully withdrawn from the hole.

The handling tool 100 further comprises a gripping device to grip the radioactive source, e.g. a "quick connect" type mechanism as will be described in greater detail below in a dedicated section of this description. The quick connect mechanism is located inside the chamber 103, and is attached to an extremity of a second elongated tube 109. The second elongated tube 109 may be moved in both longitudinal directions inside the elongated tube 102. The elongated tube 109 is terminated at an extremity opposite the radioactive source by a second handle 110. By moving the second handle 110 in direction of the handle 104, the quick connect mechanism is caused to move out of the chamber 103. By moving the second handle 110 in direction away from the handle 104, the quick connect mechanism is moved into the chamber 103. Moving of the quick connect mechanism out and into the chamber 103 may only be performed if the flapper 107 is in the open position.

Securing of Radioactive Source in a Source Pocket

The radioactive source may be secured in the radioactive measurement tool or the storage receptacle by two independent means, respectively a primary means and a secondary means.

Figure 2:
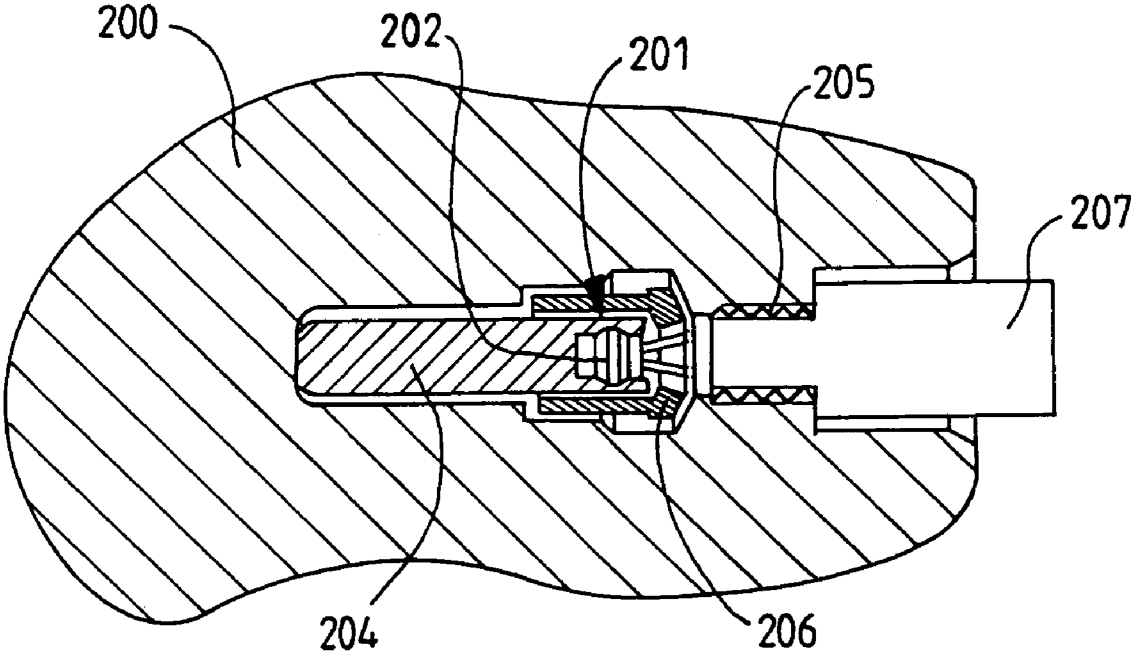
FIG. 2 is a schematic illustration of an example source pocket according to the invention.

FIG. 2 shows the radioactive source 204 as positioned inside of an example embodiment of a source pocket 200 of the radioactive measurement device (not represented in FIG. 2) or the storage device (not represented in FIG. 2).

The primary means comprises a threaded sealing plug mechanism. A threaded sealing plug 207 may be positioned inside of a thread 205 formed inside of the pocket 200.

The secondary means comprises a set of retaining fingers 206 mounted inside of the source pocket 200. The set of retaining fingers 206 is dimensioned to allow the radioactive source 204 to be freely introduced into the source pocket 200 of the radioactive measurement tool or the storage receptacle. Once the radioactive source 204 is introduced into the source pocket 200, the set of retaining fingers 206 maintains the radioactive source 204 inside the source pocket 200. The retaining fingers 206 may be spread for the radioactive source 206 to be retrieved outside of the source pocket 200.

Quick Connect Mechanism of Handling Tool

Referring again to FIG. 1 the quick connect assembly comprises spring fingers 111 that allow to grip the radioactive source (not represented in FIG. 1). The quick connect assembly further comprises a ring 112 that may serve to spread the retaining fingers 206 when the quick connect mechanism is introduced into the source pocket 200 of FIG. 2, as will be explained in more detailed in the following paragraphs.

The spring fingers 111 and the ring 112 are mounted to remain substantially at a constant distance between each other. The spring fingers 111 and the ring 112 are slidably mounted on a core 113. An axial spring 114 separates the spring fingers 111 and the ring 112 from the elongated tube 109 such that the axial spring 114 is compressed when the spring fingers 111 slide toward the elongated tube 109.

The radioactive source (not represented in FIG. 1) preferably has a specific shape to be used together with the quick connect mechanism. Referring to FIG. 2, a source head 201 is shown as part of the radioactive source 204. The source head 201 forms a cylindrical bore with a recessed groove 202.

The spring fingers 111 have a shape that matches a profile of the recessed groove 202 in order to grip the radioactive source.

Attaching of the Quick Connect Mechanism to the Radioactive Source

In an initial position of the quick connect assembly, the spring fingers 111 are aligned with a diameter of a core shoulder 115. When the quick connect assembly is pushed into contact with the radioactive source, the spring fingers 111 are pushed back to slide along the core 113, away from the core shoulder 115, thereby compressing the axial spring 114. In this pushed back position, the spring fingers 111 align with a part of the core 113 having a diameter smaller than the diameter of the core shoulder 115. In the pushed back position the spring fingers 111 may be inserted in the recessed groove 202 (not represented in FIG. 1), since the spring fingers 111 may collapse to a diameter of the cylindrical bore preceding the recessed groove prior to passing into the recessed groove 202. Once inserted in the recessed groove 202, the spring fingers 111 elastically expand into the recessed groove 202, thereby exerting a grip on the radioactive source 204.

The described introduction of the spring fingers 111 into the recessed groove 202 occurs when the quick connect mechanism is introduced into the source pocket 200. Also during this introduction, the ring 112 enters in contact with the retaining fingers 206 and spreads the retaining fingers 206 radially outwards. With the retaining fingers 206 spread, it is possible to retrieve the radioactive source 204 from the source pocket 200.

Next, the core 113 may be pulled back, in a direction away from the radioactive source 204. The axial spring 114 keeps the spring fingers 111 pushed against the source head 201 whilst the core shoulder 115 moves back beneath the spring fingers 111 preventing them from collapsing. Thus the radioactive source 204 becomes securely attached to the quick connect.

Releasing of the Radioactive Source from the Quick Connect

In order to release the quick connect mechanism from the radioactive source 204, and more precisely from the source head 201, the core is moved further inside of the cylindrical bore of the radioactive source head 201. During this movement of the core the spring fingers 111 become aligned with a part of the core 113 having a diameter smaller than the diameter of the core shoulder 115. Hence the spring fingers 111 may collapse and adopt a diameter that allows to withdraw the quick connect from the cylindrical bore of the source head 201.

Referring further to FIG. 1, the core 113 is attached to a rod 116 which passes inside the second elongated tube 109. The rod 116 may be terminated by a quarter turn mechanism 117 that is preferably contained in the second handle 110. Also preferably the quarter turn mechanism comprises a spring 120. The quarter turn mechanism 117 controls the axial displacement of the rod 116, and hence of the core 113, between two defined positions. In an initial position 118 of the quarter turn mechanism 117, the quick connect mechanism may only be introduced into the source head 201 and grip the source head 201. The spring 120 tends to maintain the quarter turn mechanism 117 in the initial position 118. In a second position 119, the core 113 is moved further inside the source head 201 such that the quick connect mechanism releases the source head 201. In the second position 119 the quick connect mechanism may not re-engage and grip the source head 201 in the recessed groove 202. In the second position 119 the spring 120 is compressed.

Preferably, the handling tool 100 comprises a set of flags 122 that deploy away from the handling tool 100 to indicate that a radioactive source is contained in the chamber 103.

The invention enables a transfer of a radioactive source to and from acontainer, e.g. a logging tool, in an effective and reliable manner while the personnel manipulating the source remains at a safe distance from the source. A typical transfer operation would be as follows:

1. Threaded plugs are removed from source pockets (200) in the radioactive measurement device and in the storage receptacle;
2. The chamber 103 from the handling tool 100 is inserted into the storage receptacle, using the handle 104, and the flapper 107 is thereby opened;
3. The quick connect mechanism is advanced out of the chamber 103 into the source pocket (200) of the storage receptacle, using the second handle 110 and engages the radioactive source 204;
4. The radioactive source 204 is retrieved from the source pocket 200 and pulled into the chamber 103, and the flags 122 are deployed;
5. The chamber 103 is withdrawn from the storage receptacle, thereby closing the flapper 107;
6. At this stage, the radioactive source 204 is safely secured in the handling tool 100 by two independent means, i.e., by the chamber 103 and by the quick connect mechanism;
7. The radioactive source 204 is carried in the handling tool 100 to the radioactive measurement device, e.g. to a logging tool;
8. The chamber 103 is inserted into the source pocket (200) of the radioactive measurement device, and the flapper 107 thereby opened;
9. The radioactive source 204 is advanced into the source pocket 200, and thereby the flags 122 are retracted;
10. The quarter turn mechanism is turned into the second position 119, i.e., in the release position, such as to release the source within the receptacle;
11. The quick connect mechanism is retracted from the radioactive source 204, and the radioactive source 204 is held inside the source pocket 200 by the retaining fingers 206;
12. The chamber 103 of the handling tool 100 is withdrawn from the source pocket of the radioactive measurement device, and the flapper 107 thereby closed;
13. The receptacle plug of the source pocket 200 is inserted (screwed) into the pocket thread 205.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A handling tool for securely handling a radioactive source the handling tool comprising a gripping device to grip and release a radioactive source, a first securing device and a second securing device, wherein the first securing device comprises:

a chamber adapted to contain the radioactive source;

an annular flapper cage, the annular flapper cage being slidably mounted on the chamber, the annular flapper cage sliding to an open position relative to the chamber when the chamber is brought in proximity with a source pocket the annular flapper cage sliding to a closed position relative to the chamber when the chamber is withdrawn from the source pocket, and a flapper movably mounted onto the annular flapper cage such that the flapper moves to open the chamber in the open position of the annular flapper cage, and the flapper moves to close the chamber in the closed position of the annular flapper cage;

wherein the second securing device comprises:

said gripping device to grip and release a radioactive source; and a positioning mechanism to position the gripping device in the source pocket or inside the chamber of the first securing device.

2. The handling tool of claim 1, wherein the first securing device further comprises an elongated tube mounted to the chamber, the elongated tube allowing to position the chamber.

3. The handling tool according to claim 2, wherein the second securing device comprises a second elongated tube, the second elongated tube cooperating with the positioning mechanism and the gripping device, and slides through the elongated tube of the first securing device in order to access the inside of the chamber, and in order to position the gripping device.

4. The handling tool according to claim 3, wherein the second elongated tube comprises at an extremity opposite from the gripping device, control means for actuating the gripping device.

5. The handling tool of claim 1, wherein a spring maintains the annular flapper cage in the closed position when the chamber is withdrawn from the source pocket, the spring being deformed when the annular flapper cage is brought into the open position.

6. The handling tool of claim 1, wherein the flapper produces an optical indication indicating if the chamber is open.

7. The handling tool of claim 1, wherein the gripping device comprises:

a core having at least a section of a first diameter and a section of a second diameter, the first diameter being greater than the second diameter, at least one spring finger, the spring finger producing an engaging structure of variable size, the spring finger being movably connected to the core, such that the spring finger may be positioned at either one of the first diameter or the second diameter of the core, the spring finger producing an engaging structure of large size when the spring finger is positioned at the first diameter, and the spring finger being able to produce an engaging structure of small size when the spring finger is positioned at the second diameter, the small size being inferior than the large size.

8. The handling tool of claim 7, wherein the gripping device further comprises a rod, the rod allowing to position the core relative to the spring finger when the rod is actuated.

9. The handling tool according to claim 8, wherein the gripping device further comprises a second elongated tube, the rod passing inside the second elongated tube, the second elongated tube further passing through a wall of the chamber, and the second elongated tube allowing to position the gripping device in the source pocket or inside the chamber when the second elongated tube is actuated.

10. The handling tool according to claim 1, wherein the positioning mechanism comprises a second elongated tube, the second elongated tube being mounted to the gripping device, the second elongated tube further passing through a wall of the chamber, and the second elongated tube allowing to position the gripping device when the second elongated tube is actuated.

11. The handling tool according to claim 1, further comprising a retainer mechanism actuator to cooperate with a retainer mechanism of the source pocket, the retainer mechanism allowing to release the radioactive source from the source pocket when actuated by the retainer mechanism actuator.

12. The handling tool of claim 11, wherein the retainer mechanism actuator comprises a ring, the ring being included with the second securing device.

13. The handling tool of claim 1, wherein the source pocket for receiving a radioactive source comprising:

retaining means for retaining the radioactive source inside the source pocket when in a retaining position and releasing the radioactive source when in a release position, and sealing means for sealing the radioactive source inside of the source pocket, wherein the retaining means are arranged to cooperate with the handling tool.

14. The handling tool according to claim 13, wherein the retaining means comprise positionable retaining fingers, and the source pocket further comprises a threaded opening made in the source pocket to receive a sealing plug.

15. A method for securely handling a radioactive source, comprising:

pushing a closed chamber of a handling tool into a source pocket, thereby opening the chamber;

remotely controlling a movement of a gripping device from inside the chamber to inside the source pocket;

gripping a radioactive source located inside the source pocket using the gripping device;

remotely controlling the movement of the gripping device from the inside of the source pocket to the inside of the chamber, thereby retrieving the radioactive source from the source pocket;

withdrawing the open chamber away from the source pocket, thereby closing the chamber; and releasing a retaining mechanism inside of the source pocket by the movement of the gripping device inside the source pocket.

16. The method according to claim 15, further comprising:

introducing at least a part of the gripping device into a recess of a radioactive source;

expanding by remote control the introduced part of the gripping device to attach the radioactive source to the gripping device.

17. A handling tool for securely handling a radioactive source, the handling tool comprising a gripping device to grip and release a radioactive source, a first securing device and a second securing device, wherein the first securing device comprises:

a chamber adapted to contain the radioactive source;

an flapper mechanism for opening or closing the chamber based on movement of the chamber, wherein the flapper mechanism opening the chamber when the chamber is brought in proximity with a source pocket that may contain a radioactive source, and the flapper mechanism closing the chamber when the chamber is withdrawn from the source pocket;

wherein the second securing device comprises:

said gripping device to grip and release a radioactive source;

a positioning mechanism to position the gripping device in the source pocket or inside the chamber of the first securing device; and a retainer mechanism actuator to cooperate with e a retainer mechanism of the source pocket, the retainer mechanism configured to release the radioactive source from the source pocket when activated by the retainer mechanism actuator.

* * * * *